US012749199B2

(12) United States Patent
Wang et al.

(10) Patent No.: US 12,749,199 B2
(45) Date of Patent: Sep. 29, 2026

(54) LIVER CT IMAGE SEGMENTATION SYSTEM AND ALGORITHM BASED ON MIXED SUPERVISED LEARNING

(71) Applicant: Zhejiang University, Hangzhou (CN)

(72) Inventors: Yue Wang, Hangzhou (CN); Lilu Liu, Hangzhou (CN); Xiuping Nie, Hangzhou (CN); Rong Xiong, Hangzhou (CN)

(73) Assignee: Zhejiang University, Hangzhou (CN)

( * ) Notice: Subject to any disclaimer, the term of this patent is extended or adjusted under 35 U.S.C. 154(b) by 256 days.

(21) Appl. No.: 18/608,929

(22) Filed: Mar. 19, 2024

(65) Prior Publication Data

US 2024/0221174 A1 Jul. 4, 2024

Related U.S. Application Data

(63) Continuation of application No. PCT/CN2022/101697, filed on Jun. 27, 2022.

(30) Foreign Application Priority Data

Oct. 11, 2021 (CN) .......................... 202111180680.6

(51) Int. Cl.
*G06T 7/194* (2017.01)
*G06T 7/00* (2017.01)
(Continued)

(52) U.S. Cl.
CPC ............ *G06T 7/194* (2017.01); *G06T 7/0012* (2013.01); *G06V 10/40* (2022.01); *G06V 10/764* (2022.01);
(Continued)

(58) Field of Classification Search
None
See application file for complete search history.

(56) References Cited

U.S. PATENT DOCUMENTS

| | | | | |
|---|---|---|---|---|
| 2019/0125279 | A1 | 5/2019 | Peikert et al. | |
| 2020/0202524 | A1* | 6/2020 | Karki | G06T 5/94 |

(Continued)

FOREIGN PATENT DOCUMENTS

| | | | | |
|---|---|---|---|---|
| CN | 110163847 A | * 8/2019 | | G06T 7/11 |
| CN | 111291558 A | * 6/2020 | | G06N 3/045 |
| CN | 113362295 A | 9/2021 | | |

OTHER PUBLICATIONS

Liang et al, "Contrastive Cross-Modal Pre-Training: A General Strategy for Small Sample Medical Imaging"; ArXiv:2010.03060v5; Sep. 9, 2021. (Year: 2021).*

(Continued)

*Primary Examiner* — David Ometz

(57) ABSTRACT

A liver CT image segmentation system and algorithm based on mixed supervised learning is provided. The image segmentation system includes an image preprocessing unit, a feature extraction unit, a word vector segmentation unit and a single-layer convolutional classification unit. The image preprocessing unit is in data connection with the feature extraction unit. The feature extraction unit is respectively in data connection with the word vector segmentation unit and the single-layer convolutional classification unit. In the present disclosure, a multi-task framework is used for respectively performing segmentation and classification tasks, to achieve high segmentation precision through a large number of weak label data and a small number of strong labels.

8 Claims, 2 Drawing Sheets

(51) Int. Cl.
*G06V 10/40* (2022.01)
*G06V 10/764* (2022.01)

(52) U.S. Cl.
CPC ............... *G06T 2207/10081* (2013.01); *G06T 2207/20081* (2013.01); *G06T 2207/30056* (2013.01)

(56) References Cited

U.S. PATENT DOCUMENTS

| | | | | |
|---|---|---|---|---|
| 2021/0326653 | A1* | 10/2021 | Zhou | G06F 18/2163 |
| 2022/0012890 | A1* | 1/2022 | Wu | G06T 7/0012 |
| 2022/0130499 | A1* | 4/2022 | Zhou | G06F 16/24522 |

OTHER PUBLICATIONS

Z. Li, L. Lin, C. Zhang, H. Ma and W. Zhao, "Automatic Image Annotation based on Co-Training," 2019 International Joint Conference on Neural Networks (IJCNN), Budapest, Hungary, 2019, pp. 1-8. (Year: 2019).*

Y. Tang et al., "Leveraging Large-Scale Weakly Labeled Data for Semi-Supervised Mass Detection in Mammograms," 2021 IEEE/CVF Conference on Computer Vision and Pattern Recognition (CVPR), Nashville, TN, USA, 2021, pp. 3854-3863. (Year: 2021).*

1 International Search Report of PCT Patent Application No. PCT/CN2022/101697 issued on Sep. 28, 2022.

* cited by examiner

LIVER CT IMAGE SEGMENTATION SYSTEM AND ALGORITHM BASED ON MIXED SUPERVISED LEARNING

CROSS REFERENCE TO RELATED APPLICATIONS

The present application is a Continuation Application of PCT Application No. PCT/CN2022/101697 filed on Jun. 27, 2022, which claims the benefit of Chinese Patent Application No. 202111180680.6 filed on Oct. 11, 2021. All the above are hereby incorporated by reference in their entirety.

TECHNICAL FIELD

The present disclosure belongs to the interdisciplinary field of medicine and computer science, and specifically relates to a liver CT image segmentation system and algorithm based on mixed supervised learning.

BACKGROUND

CT scanning is a routine medical examination method that uses X-rays and detectors to scan the cross section of the human body. With the help of a computer, the detection information is reconstructed into a cross-sectional view, that is, a slice. Multiple slices can be combined to form a three-dimension view of the internal organs and tissues of the human body. Pixel-level segmentation of the liver in abdominal CT images is helpful for operations including pathological diagnosis, preoperative planning, and postoperative evaluation of liver diseases, and is of great significance for the treatment and research of liver diseases such as hepatitis, cirrhosis, and liver cancers. Pixel-level segmentation of the liver requires pixel-level annotation performed on the liver part in each layer of CT slices, which is generally completed by doctors in preoperative planning. However, in order to obtain images of tinier tissue lesions, high-resolution CT scanning is usually performed. Therefore, the pixel resolution in CT slices is high, and the slice thickness is small, resulting in an increase in the number of slices and thus increasing the workload of doctors.

In order to enable doctors to achieve fast and accurate liver segmentation, the existing methods mostly use a convolutional neural network structure, and use a large number of CT images with pixel-level annotations as supervision for network training, so that the network can achieve segmentation tasks. This kind of learning methods is called supervised learning, where the pixel-level annotations of CT images are called strong labels because of carrying truth value masks for segmentation tasks. On the contrary, image-level annotations, which refer to whether the CT slices contain the target object, are called weak labels.

The problem in the above supervised learning segmentation method is that pixel-level image annotation requires a significant amount of time and manpower costs during the production of a training dataset, as well as quality control by experienced doctors, making it difficult to obtain strong labels. In order to avoid the dependence of supervised learning on strong labels, the traditional solution is data augmentation, which involves cutting, rotating, flipping, and other operations on the original image to expand the training dataset to improve the generalization ability of the neural network. However, the improvement of this method is limited and wastes a large amount of effective data except for strong label data. Therefore, in recent years, many studies have proposed semi-supervised learning methods, which use generative adversarial learning, knowledge distillation, and other methods to generate pseudo labels for images without annotations, to expand the training dataset. However, these methods cannot avoid the impact of incorrect labels on network learning and are difficult to further improve image segmentation precision. In this regard, some studies have proposed mixed supervised learning, which can enhance the network's generalization ability by using weak labels with annotation costs much lower than strong labels. Weak labels do not require doctors to accurately determine and annotate the positions of lesions, thus greatly reducing manual annotation costs and achieving large-scale acquisition. Moreover, due to the accurate image category information of weak labels compared to no labels, they can better provide effective supervision, thus achieving a balance between segmentation precision requirements and annotation costs. However, the existing mixed supervision methods typically use a multi-task framework. Due to the large number of independent parameters between multiple tasks, inconsistent results may occur. Classification tasks to some extent affect the feature representation of network models, which further affects segmentation precision.

SUMMARY

The present disclosure provides a liver CT image segmentation system and algorithm based on mixed supervised learning to improve the accuracy of liver disease examination, in response to the advantages, disadvantages, and existing problems of the above algorithms. The present disclosure is implemented by adopting the following technical solution:

The present disclosure provides a liver CT image segmentation system based on mixed supervised learning, the image segmentation system including an image preprocessing unit, a feature extraction unit, a word vector segmentation unit and a single-layer convolutional classification unit, the image preprocessing unit being in data connection with the feature extraction unit, and the feature extraction unit being respectively in data connection with the word vector segmentation unit and the single-layer convolutional classification unit.

As a further improvement, in the present disclosure, a construction process of the image preprocessing unit includes:

truncating the range of HU values in a CT slice image into $[H_1, H_2]$, where $H_1$ and $H_2$ respectively represent a lower limit and an upper limit of rough HU values capable of preserving a liver tissue intact and removing a bone structure, and then scaling the size of the slice image to $(H_0, W_0)$, where $(H_0, W_0)$ represents the size of an input image of the feature extraction unit.

As a further improvement, in the present disclosure, a construction process of the feature extraction unit includes:

using U-Net as a basic framework, for an output feature map of a second-to-last convolutional layer of U-Net, the size satisfying $(B, C_0, H, W)$, where B represents the number of images in each batch, C represents the number of channels, and (H, W) represents the resolution of the feature map, passing the feature map through a convolutional layer with an input channel of $C_0$, an output channel of C and a kernel size of $(K_0, K_0)$, then performing batch normalization on an output result, and finally passing through a Tan h activation function to obtain a target feature map with a size of (B, C, H, W).

As a further improvement, in the present disclosure, a construction process of the word vector segmentation unit includes:

introducing a learnable word vector v with dimensions of C, the word vector v convolving with the above target feature map to obtain a heat map with a size of (B, 1, H, W), calculating the confidence of each pixel of the heat map by using a sigmoid activation function to obtain the segmentation confidence of each pixel, and dividing foregrounds and backgrounds by using $\tau_s$ as a threshold, pixels with the segmentation confidence less than the threshold being considered as background regions, and pixels with the segmentation confidence greater than or equal to the threshold being considered as foreground regions, that is, liver regions.

As a further improvement, in the present disclosure, a construction process of the single-layer convolutional classification unit includes:

convolving the above target feature map generated by the feature extraction unit by using a learnable $K_1 \times K_1$ kernel to obtain a heat map with a size of (B, 1, H, W), where $K_1 < H$ and $K_1 < W$, performing calculation on the heat map by using a maxpooling function to obtain a maximum feature response value in each image in a current batch, then inputting the maximum feature response value into a sigmoid function to calculate the confidence of each image, and dividing the confidence by using $\tau_c$ as a threshold, the confidence less than the threshold being considered as that the liver region does not exist in the image, and the confidence equal to or greater than the threshold being considered as that the liver region exists in the image.

The present disclosure further discloses a segmentation algorithm for the liver CT image segmentation system based on mixed supervised learning, segmentation in the algorithm including a testing stage and a training stage, the testing stage including:

performing CT scanning to obtain an abdominal CT image to be segmented, splitting the CT image into single-frame two-dimension CT slices along a human body axis, sequentially inputting the single-frame two-dimension CT slices into the image preprocessing unit, inputting a preprocessed image into the feature extraction unit, and inputting output deep-level image features into the word vector segmentation unit to complete a liver pixel-level segmentation task.

As a further improvement, in the present disclosure, in the training stage, a CT scanning dataset is constructed, and a construction process of the dataset includes: acquiring abdominal CT scanning data, splitting CT into a series of two-dimension slice images along the human body axis, performing manual classification on all slice images based on whether the slice images contain a liver to obtain weak labels, images with the liver being classified into a foreground, and images without the liver being classified into a background, and randomly selecting from all images classified into the foreground a part of images in a number much less than the total number of the images classified into the foreground to perform pixel-level annotation to obtain strong labels, the number of the strong labels and the number of the foreground weak labels being respectively expressed as s and w.

As a further improvement, in the present disclosure, several images are randomly sampled from the images with the strong labels and are sequentially passed through the image preprocessing unit, the feature extraction unit and the word vector segmentation unit, and a binary cross entropy loss $Loss_s$ is calculated as follows for each corresponding pixel of the output confidence images and the strong labels after the pixel-level annotation:

$$\mathrm{Loss}_s = -\frac{1}{N}\sum_{n=1}^{N} y_n \cdot \log\sigma(x_n) + (1-y_n)\cdot\log\sigma(1-x_n)$$

where $x_n$ represents the pixel value of the heat map generated after feature map convolution, $y_n$ represents the corresponding strong label truth value, $\sigma(\cdot)$ represents the sigmoid function, and N represents the total number of all pixels; and then the strong labels are mapped onto the target feature map, the same number of several foreground pixel features and background pixel features are sampled according to regions where the foreground and the background are located, and a triplet loss $Loss_t$ is calculated as follows in combination with the word vector v:

$$\mathrm{Loss}_t = \frac{1}{M}\sum_{i=1}^{M} \max(d(v, p_i) - d(v, n_i) + \mathrm{margin}, 0)$$

where $p_i$ represents the foreground pixel features, $n_i$ represents the background pixel features, $d(\cdot)$ represents the distance between vectors, margin represents an offset for adjusting the effective distance between vectors, and M represents the number of times of sampling.

As a further improvement, in the present application, several images are randomly sampled from the foreground images with the weak labels and are sequentially passed through the image preprocessing unit, the feature extraction unit and the single-layer convolutional classification unit to obtain the confidence of the images, and a classification loss $Loss_{cf}$ of the foreground is calculated as follows in combination with image-level class labels:

$$\mathrm{Loss}_{cf} = -y_{wf}\cdot\log\sigma(x_{wf})$$

where $x_{wf}$ represents the maximum response value of the heat map, and $y_{wf}$ represents the truth value class label of the foreground images; and several images are randomly sampled from the background images with the weak labels and sequentially passed through the image preprocessing unit, the feature extraction unit and the single-layer convolutional classification unit to obtain the confidence of the images, and a classification loss $Loss_{cb}$ of the background is calculated as follows in combination with image-level class labels:

$$\mathrm{Loss}_{cb} = -(1-y_{wb})\cdot\log\sigma(x_{wb})$$

where $x_{wb}$ represents the maximum response value of the heat map and $y_{wb}$ represents the truth value class label of the background images, so an overall loss function for network training is expressed as:

$$\mathrm{Loss} = \mathrm{Loss}_s + \mathrm{Loss}_t + \mathrm{Loss}_{cf} + \mathrm{Loss}_{cb}$$

Compared with the prior art, the present disclosure has the following beneficial effects:

A multi-task framework is used for respectively performing segmentation and classification tasks, to achieve high segmentation precision through a large number of weak label data and a small number of strong labels. For the problem that the independent parameter quantity among multiple tasks is large, network parameters shared among the multiple tasks are increased as many as possible, a learnable word vector v is used for achieving the segmentation tasks, and a 1×1 kernel is used for performing single-layer convolution to implement classification tasks, to reduce the number of independent parameters and improve the result consistency among multiple tasks.

For the problem of interference caused by classification tasks on the feature representation of network models, the present disclosure introduces the learnable word vector v to convolve the feature layer, and introduces the triplet loss in metric learning to explicitly learn the feature representation, making pixel-level features of the same class consistent.

The segmentation performance of mixed supervised learning is significantly better than that of supervised learning using a small number of strong labels. The present disclosure is significantly superior to existing methods in classification and segmentation indicators, can maintain high performance for both classification and segmentation tasks, and can achieve good consistency.

DETAILED DESCRIPTION

Figure 1:
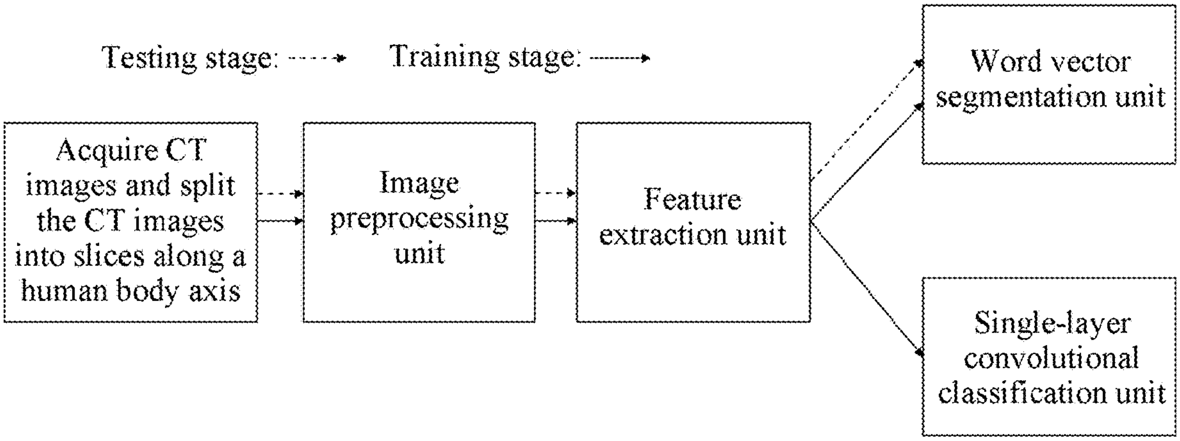
FIG. 1 illustrates a flowchart of a liver CT image segmentation algorithm based on mixed supervised learning according to an embodiment.

The present disclosure provides a liver CT image segmentation system based on mixed supervised learning. The image segmentation system includes an image preprocessing unit, a feature extraction unit, a word vector segmentation unit and a single-layer convolutional classification unit. The image preprocessing unit is in data connection with the feature extraction unit. The feature extraction unit is respectively in data connection with the word vector segmentation unit and the single-layer convolutional classification unit.

A construction process of the image preprocessing unit includes:

truncating the range of HU values in a CT slice image into $[H_1, H_2]$, where $H_1$ and $H_2$ respectively represent a lower limit and an upper limit of rough HU values capable of preserving a liver tissue intact and removing a bone structure, and then scaling the size of the slice image to $(H_0, W_0)$, where $(H_0, W_0)$ represents the size of an input image of the feature extraction unit.

A construction process of the feature extraction unit includes:

using U-Net as a basic framework, for an output feature map of a second-to-last convolutional layer of U-Net, the size satisfying $(B, C_0, H, W)$, where B represents the number of images in each batch, C represents the number of channels, and (H, W) represents the resolution of the feature map, passing the feature map through a convolutional layer with an input channel of $C_0$, an output channel of C and a kernel size of $(K_0, K_0)$, then performing batch normalization on an output result, and finally passing through a Tan h activation function to obtain a target feature map with a size of (B, C, H, W).

A construction process of the word vector segmentation unit includes:

introducing a learnable word vector v with dimensions of C, the word vector v convolving with the above target feature map to obtain a heat map with a size of (B, 1, H, W), calculating the confidence of each pixel of the heat map by using a sigmoid activation function to obtain the segmentation confidence of each pixel, and dividing foregrounds and backgrounds by using $\tau_s$ as a threshold, pixels with the segmentation confidence less than the threshold being considered as background regions, and pixels with the segmentation confidence greater than or equal to the threshold being considered as foreground regions, that is, liver regions.

A construction process of the single-layer convolutional classification unit includes:

convolving the above target feature map generated by the feature extraction unit by using a learnable $K_1 \times K_1$ kernel to obtain a heat map with a size of (B, 1, H, W), where $K_1 < H$ and $K_1 < W$, performing calculation on the heat map by using a maxpooling function to obtain a maximum feature response value in each image in a current batch, then inputting the maximum feature response value into a sigmoid function to calculate the confidence of each image, and dividing the confidence by using $\tau_c$ as a threshold, the confidence less than the threshold being considered as that the liver region does not exist in the image, and the confidence equal to or greater than the threshold being considered as that the liver region exists in the image.

The present disclosure further discloses a liver CT image segmentation algorithm based on mixed supervised learning. In a testing stage of the algorithm, the following steps are executed. FIG. 1 illustrates a flowchart of a liver CT image segmentation algorithm based on mixed supervised learning according to an embodiment. CT scanning is performed to obtain an abdominal CT image to be segmented. The CT image is split into single-frame two-dimension CT slices along a human body axis. The single-frame two-dimension CT slices are sequentially input into the image preprocessing unit. A preprocessed image is input into the feature extraction unit. Output deep-level image features are input into the word vector segmentation unit to complete a liver pixel-level segmentation task.

In a training stage of the algorithm, the following steps are executed. A CT scanning dataset is constructed, and abdominal CT scanning data are acquired. CT is split into a series of two-dimension slice images along the human body axis. Manual classification is performed on all slice images based on whether the slice images contain a liver to obtain weak labels. Images with the liver are classified into a foreground. Images without the liver are classified into a background. A part of images in a number much less than the total number of the images classified into the foreground are randomly selected from all images classified into the foreground to perform pixel-level annotation to obtain strong labels.

Figure 2:
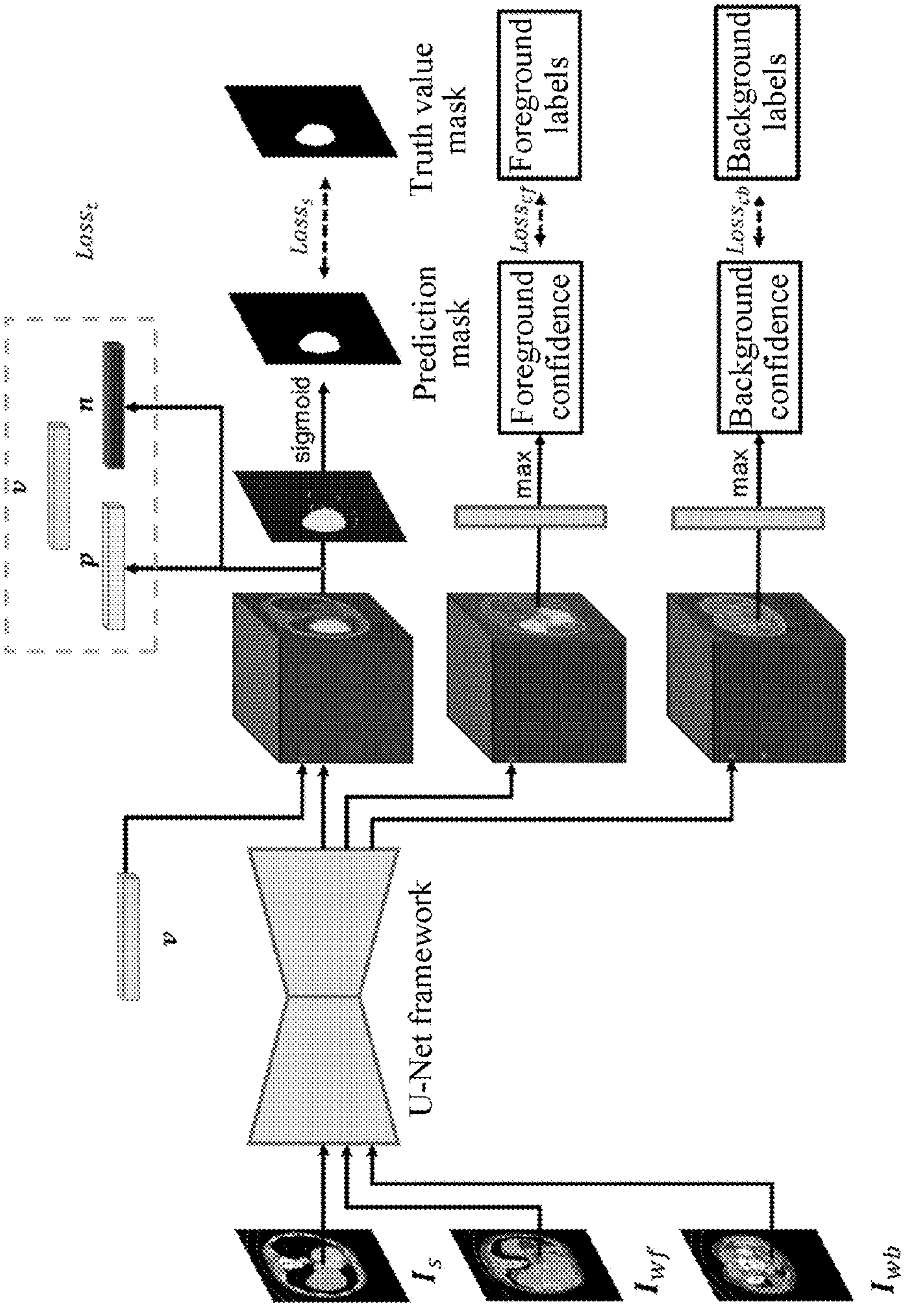
FIG. 2 illustrates a schematic diagram of a network model structure and calculation of a loss function in a training stage in an algorithm according to an embodiment.

The number of the strong labels and the number of the foreground weak labels are respectively expressed as s and w. FIG. 2 illustrates a schematic diagram of a network model structure and calculation of a loss function in a training stage in an algorithm according to an embodiment. Several images are randomly sampled from the images with the strong labels and are sequentially passed through the image preprocessing unit, the feature extraction unit and the word vector segmentation unit. A binary cross entropy loss $Loss_s$ is calculated as follows for each corresponding pixel of the output confidence images and the strong labels after the pixel-level annotation:

$$Loss_s = -\frac{1}{N}\sum_{n=1}^{N} y_n \cdot \log\sigma(x_n) + (1-y_n)\cdot\log\sigma(1-x_n)$$

where $x_n$ represents the pixel value of the heat map generated after feature map convolution, $y_n$ represents the corresponding strong label truth value, $\sigma(\bullet)$ represents the sigmoid function, and N represents the total number of all pixels. Then the strong labels are mapped onto the target feature map. The same number of several foreground pixel features and background pixel features are sampled according to regions where the foreground and the background are located. A triplet loss $Loss_t$ is calculated as follows in combination with the word vector v:

$$Loss_t = \frac{1}{M}\sum_{i=1}^{M} \max(d(v, p_i) - d(v, n_i) + \text{margin}, 0)$$

where $p_i$ represents the foreground pixel features, $n_i$ represents the background pixel features, $d(\bullet)$ represents the distance between vectors, margin represents an offset for adjusting the effective distance between vectors, and M represents the number of times of sampling.

Several images are randomly sampled from the foreground images with the weak labels and are sequentially passed through the image preprocessing unit, the feature extraction unit and the single-layer convolutional classification unit to obtain the confidence of the images. A classification loss $Loss_{cf}$ of the foreground is calculated as follows in combination with image-level class labels:

$$Loss_{cf} = -y_{wf}\cdot\log\sigma(x_{wf})$$

where $x_{wf}$ represents the maximum response value of the heat map and $y_{wf}$ represents the truth value class label of the foreground images. Similarly, several images are randomly sampled from the background images with the weak labels and sequentially passed through the image preprocessing unit, the feature extraction unit and the single-layer convolutional classification unit to obtain the confidence of the images. A classification loss $Loss_{cb}$ of the background is calculated as follows in combination with image-level class labels:

$$Loss_{cb} = -(1-y_{wb})\cdot\log\sigma(x_{wb})$$

where $x_{wb}$ represents the maximum response value of the heat map and $y_{wb}$ represents the truth value class label of the background images. So, an overall loss function for network training is expressed as:

$$Loss = Loss_s + Loss_t + Loss_{cf} + Loss_{cb}$$

The present disclosure was experimented on a publicly available LiTS abdominal CT dataset. The ratio of strong labels to foreground weak labels was 1:49. Firstly, ablation experiments were conducted on whether to introduce a triplet loss. The results are as follows:

| Triplet loss | Accuracy | Precision | Recall | F1 | AUC | Dice | IOU |
|---|---|---|---|---|---|---|---|
| Yes | 91.79% | 0.814 | 0.964 | 0.883 | 0.985 | 0.937 | 0.882 |
| No | 90.53% | 0.787 | 0.968 | 0.868 | 0.985 | 0.931 | 0.870 |

Accuracy, precision, recall, F1, and AUC are commonly used indicators for classification tasks, while Dice and IOU are commonly used indicators for segmentation tasks. According to the results in Table 1, introducing the triplet loss can significantly improve the performance of the network in classification and segmentation tasks. In addition, the comparison results between the present disclosure and the existing mixed supervision method are as follows:

| | Accuracy | Precision | Recall | F1 | AUC | Dice | IOU |
|---|---|---|---|---|---|---|---|
| U-Net | — | — | — | — | — | 0.884 | 0.792 |
| U-Net-m | 48.43% | 0.383 | 0.992 | 0.553 | 0.964 | 0.924 | 0.859 |
| Pawel-19 | 54.53% | 0.412 | 0.979 | 0.580 | 0.923 | 0.901 | 0.820 |
| Ours | 91.79% | 0.814 | 0.964 | 0.883 | 0.985 | 0.937 | 0.882 |

U-Net represents supervised learning using strong labels based on a U-Net framework, U-Net-m represents a multi-task framework that uses the U-Net to complete segmentation tasks and complete classification tasks by passing intermediate layer results through a fully connected network. Pawel-19 represents the multi-task network structure in Pawel et al.'s "Deep learning with mixed supervision for brain tuber segmentation". As shown by the results, the segmentation performance of mixed supervised learning is significantly better than that of supervised learning using a small number of strong labels. The present disclosure is significantly superior to existing methods in classification and segmentation indicators, can maintain high performance for both classification and segmentation tasks, and can achieve good consistency.

The above implementations are only exemplary implementations of the present disclosure, which are not intended to limit the scope of protection of the present disclosure. Any non-substantial changes or replacements made by those skilled in the art on the basis of the present disclosure still belong to the scope of protection of the present disclosure.

What is claimed is:

1. A liver Computed Tomography (CT) image segmentation system based on mixed supervised learning, the image segmentation system comprising:

an image preprocessing unit, a feature extraction unit, a word vector segmentation unit and a single-layer convolutional classification unit, the image preprocessing unit being in data connection with the feature extraction unit, and the feature extraction unit being respectively in data connection with the word vector segmentation unit and the single-layer convolutional classification unit;

wherein a construction process of the feature extraction unit comprises:

using U-Net as a basic framework, for an output feature map of a second-to-last convolutional layer of the U-Net, with a size satisfying (B, $C_0$, H, W), where B represents a number of images in each batch, C represents a number of channels, and (H, W) represents a resolution of the output feature map, passing the output feature map through a convolutional layer with an input channel of $C_0$, an output channel of C and a kernel size of ($K_0$, $K_0$), then performing batch normalization on an output result, and finally passing through a Tanh activation function to obtain a target feature map with a size of (B, C, H, W).

2. The liver CT image segmentation system based on mixed supervised learning according to claim 1, wherein a construction process of the image preprocessing unit comprises:

truncating a range of HU values in a CT slice image into [$H_1$, $H_2$], where $H_1$ and $H_2$ respectively represent a lower limit and an upper limit of rough Hounsfield Unit (HU) values capable of preserving a liver tissue intact and removing a bone structure, and then scaling a size of the slice image to ($H_0$, $W_0$), where ($H_0$, $W_0$) represents a size of an input image of the feature extraction unit.

3. The liver CT image segmentation system based on mixed supervised learning according to claim 1, wherein a construction process of the word vector segmentation unit comprises:

introducing a learnable word vector v with a dimension of C, the word vector v convolving with the target feature map to obtain a heat map with a size of (B, 1, H, W), calculating a confidence of each pixel of the heat map by using a sigmoid activation function to obtain a segmentation confidence of each pixel, and dividing foregrounds and backgrounds by using $\tau_s$ as a threshold, pixels with the segmentation confidence less than the threshold being considered as a background region, and pixels with the segmentation confidence greater than or equal to the threshold being considered as a foreground region that is a liver region.

4. The liver CT image segmentation system based on mixed supervised learning according to claim 1, wherein a construction process of the single-layer convolutional classification unit comprises:

convolving the target feature map generated by the feature extraction unit by using a learnable $K_1 \times K_1$ kernel to obtain a heat map with a size of (B, 1, H, W), where $K_1 < H$ and $K_1 < W$, performing calculation on the heat map by using a max-pooling function to obtain a maximum feature response value in each image in a current batch, then inputting the maximum feature response value into a sigmoid function to calculate a confidence of each image, and dividing the confidence by using $\tau_c$ as a threshold, the confidence less than the threshold being considered as that a liver region does not exist in the image, and the confidence equal to or greater than the threshold being considered as that the liver region exists in the image.

5. A segmentation algorithm for the liver CT image segmentation system based on mixed supervised learning according to claim 1, segmentation in the algorithm comprising a testing stage and a training stage, the testing stage comprising:

performing CT scanning to obtain an abdominal CT image to be segmented, splitting the CT image into single-frame two-dimension CT slices along a human body axis, sequentially inputting the single-frame two-dimension CT slices into the image preprocessing unit, inputting a preprocessed image into the feature extraction unit, and inputting output deep-level image features into the word vector segmentation unit to complete a liver pixel-level segmentation task.

6. The segmentation algorithm for the liver CT image segmentation system based on mixed supervised learning according to claim 5, wherein in the training stage, a CT scanning dataset is constructed, and a construction process of the dataset comprises:

acquiring abdominal CT scanning data, splitting the CT scanning data into a series of two-dimension slice images along the human body axis, performing manual classification on all slice images based on whether the slice images contain a liver to obtain weak labels, images with the liver being classified into a foreground, and images without the liver being classified into a background, and randomly selecting from the images classified into the foreground a part of images in a number much less than a total number of the images classified into the foreground to perform a pixel-level annotation to obtain strong labels, a number of the strong labels and a number of foreground weak labels being respectively expressed as s and w.

7. The segmentation algorithm for the liver CT image segmentation system based on mixed supervised learning according to claim 6, wherein a plurality of images are randomly sampled from images with the strong labels and are sequentially passed through the image preprocessing unit, the feature extraction unit and the word vector segmentation unit, and a binary cross entropy loss $Loss_s$ is calculated as follows for each corresponding pixel of output confidence images and the strong labels after the pixel-level annotation:

$$Loss_s = -\frac{1}{N}\sum_{n=1}^{N} y_n \cdot \log\sigma(x_n) + (1-y_n)\cdot\log\sigma(1-x_n)$$

where $x_n$ represents a pixel value of a heat map generated after a feature map convolution, $y_n$ represents a corresponding strong label truth value, $\sigma(\bullet)$ represents a sigmoid function, and N represents a total number of all pixels; and then the strong labels are mapped onto a target feature map, a plurality of foreground pixel features and background pixel features having a same number are sampled according to regions where the foreground and the background are located, and a triplet loss $Loss_t$ is calculated as follows in combination with a word vector v:

$$Loss_t = \frac{1}{M}\sum_{i=1}^{M} \max(d(v, p_i) - d(v, n_i) + \text{margin}, 0)$$

where $p_i$ represents the foreground pixel features, $n_i$ represents the background pixel features, d(•) represents a distance between vectors, margin represents an offset for adjusting an effective distance between vectors, and M represents a number of times of sampling.

8. The segmentation algorithm for the liver CT image segmentation system based on mixed supervised learning according to claim 6, wherein a plurality of images are randomly sampled from foreground images with the weak labels and are sequentially passed through the image preprocessing unit, the feature extraction unit and the single-layer convolutional classification unit to obtain a confidence of the images, and a classification loss $Loss_{cf}$ of the foreground is calculated as follows in combination with image-level class labels:

$$\mathrm{Loss}_{cf} = -y_{wf} \cdot \log\sigma(x_{wf})$$

where $x_{wf}$ represents a maximum response value of a heat map, and $y_{wf}$ represents a truth value class label of the foreground images; and a plurality of images are randomly sampled from the background images with the weak labels and sequentially passed through the image preprocessing unit, the feature extraction unit and the single-layer convolutional classification unit to obtain the confidence of the images, and a classification loss $Loss_{cb}$ of the background is calculated as follows in combination with the image-level class labels:

$$\mathrm{Loss}_{cb} = -(1 - y_{wb}) \cdot \log\sigma(x_{wb})$$

where $x_{wb}$ represents a maximum response value of the heat map and $y_{wb}$ represents a truth value class label of the background images.

* * * * *